United States Patent
Zhang

(10) Patent No.: US 10,208,700 B2
(45) Date of Patent: Feb. 19, 2019

(54) METHOD TO CONTROL FUEL SPRAY DURATION FOR INTERNAL COMBUSTION ENGINES

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 304 days.

(21) Appl. No.: 15/168,565

(22) Filed: May 31, 2016

(65) Prior Publication Data

US 2017/0342938 A1 Nov. 30, 2017

(51) Int. Cl.
| F02D 41/40 | (2006.01) |
| F02M 61/18 | (2006.01) |
| F02D 41/24 | (2006.01) |
| F02M 61/10 | (2006.01) |
| F02M 61/14 | (2006.01) |
| F02D 41/38 | (2006.01) |

(52) U.S. Cl.
CPC ....... *F02D 41/402* (2013.01); *F02D 41/2406* (2013.01); *F02M 61/10* (2013.01); *F02M 61/14* (2013.01); *F02M 61/1806* (2013.01); *F02D 2041/389* (2013.01)

(58) Field of Classification Search
CPC .... F02M 47/00; F02M 47/046; F02M 57/025; F02M 61/08; F02M 61/163; F02M 61/18; F02B 1/12
See application file for complete search history.

(56) References Cited

U.S. PATENT DOCUMENTS

| 4,658,824 A | * | 4/1987 | Scheibe | F02M 61/18 123/446 |
| 5,588,412 A | * | 12/1996 | Nozaki | F02M 61/182 123/446 |
| 5,878,961 A | | 3/1999 | Mueller et al. | |
| 6,216,466 B1 | | 4/2001 | Alkabie | |
| 7,444,980 B2 | * | 11/2008 | Cavanagh | F02M 61/182 123/299 |
| 2003/0201344 A1 | * | 10/2003 | Wark | F02M 47/00 239/533.8 |

OTHER PUBLICATIONS

Zhang, Xiaogang, "A Multi-Hole Fuel Injector with Sequential Fuel Injection," U.S. Appl. No. 14/997,756, filed Jan. 18, 2016, 36 pages.

* cited by examiner

*Primary Examiner* — Sizo Vilakazi
(74) *Attorney, Agent, or Firm* — Julia Voutyras; McCoy Russell LLP

(57) ABSTRACT

Methods and systems are provided for direct fuel injection. In one example, a fuel injector system includes an injector needle with an injector pin with a curved fuel channel of non-uniform width around the outer circumference of the injector pin, fluidically connected along the length of the curved fuel channel with a fuel reservoir inside the injector pin. An actuator coupled to the injector needle may sequentially move and position the injector needle to establish fluidic connection between the curved fuel channel and with one or more nozzle holes of the fuel injector at each position, where a duration of the fluidic connection at each position is based on a width of the curved fuel channel, and may determine the volume of fuel being discharged from only those nozzle holes, thereby reducing fuel spray interaction and increasing fuel spray atomization.

7 Claims, 11 Drawing Sheets

METHOD TO CONTROL FUEL SPRAY DURATION FOR INTERNAL COMBUSTION ENGINES

FIELD

The present description relates generally to methods and systems for controlling direct fuel injection in an internal combustion engine of a vehicle.

BACKGROUND/SUMMARY

Internal combustion engines may utilize direct fuel injection, wherein a precisely controlled amount of fuel is injected under high pressure into each engine cylinder, thereby increasing fuel efficiency and power output of the engine. In traditional direct fuel injectors, the injector nozzle hole configuration and geometry can regulate combustion characteristics and affect vehicle emissions. The fuel is typically injected from a sac at the tip of the fuel injector needle into the engine cylinder through a plurality of holes, configured in various forms to increase atomization and improve air-fuel mixing.

However, the inventors herein have recognized that in a combustion chamber of an engine, air flow may be asymmetrical due to the positioning of intake and exhaust valves along the combustion chamber. The opening of the intake valve during an intake stroke of the engine may generate turbulent air flow having high swirl and tumble in some parts of the combustion chamber, while less swirling, tumbling, and turbulence may be seen in other locations of the combustion chamber. Hence, if fuel is delivered uniformly (e.g., if the same volume of fuel is delivered) in all parts of the combustion chamber, fuel wall penetration may increase and fuel spray atomization may decrease in certain parts of the combustion chamber, such as the regions of the combustion chamber that experience less turbulent air flow, which may eventually degrade emissions.

In one example, the issues described above may be addressed by a fuel injector system including an injector body with a plurality of nozzle holes, and an injector needle coupled to an injector pin, the injector pin including a curved fuel channel in fluidic communication with a fuel reservoir inside the injector pin, the injector needle and the injector pin housed inside the injector body, the curved fuel channel including a first region having a first width and a second region having a second width, larger than the first width, and when the injector needle is actuated, the first region is configured to be in fluidic communication with a first nozzle hole of the plurality of nozzle holes to deliver a first fuel volume, and the second region is configured to be in fluidic communication with a second nozzle hole of the plurality of nozzle holes to deliver a second fuel volume, larger than the first fuel volume.

One example method of operating the above described fuel injector may include actuating a needle having a curved fuel channel housed within a fuel injector body to sequentially move the needle downward from a closed position through a plurality of open positions, fluidically connecting a width of the curved fuel channel to a specific nozzle hole/s, injecting a desired volume of fuel into different areas of a combustion chamber. In one example, a first width of the fuel channel may fluidically connect to a first nozzle hole, followed by moving the needle downward, fluidically uncoupling the first width of the fuel channel from the first nozzle hole, and fluidically connecting a second width of the fuel channel to a second nozzle hole at a second open position of the plurality of open positions, where the second width is greater than the first width. A first fuel volume may be injected through the first nozzle hole to an area of low tumble and swirl in a combustion chamber, and a second fuel volume may injected through the second nozzle hole to an area of high tumble and swirl in the combustion chamber, where the first fuel volume may be less than the second fuel volume.

In this way, in a multi-hole fuel injector assembly, an injector needle with a curved fuel channel of non-uniform width may be sequentially positioned, such that each position may establish fluidic communication between the curved fuel channel and specific nozzle hole/s for a duration based on the width of the curved fuel channel in apposition with the specific nozzle hole/s. At each position, a specific volume of fuel may be injected through the nozzle hole into a specific area of the combustion chamber, thereby minimizing fuel spray interaction and increasing fuel spray atomization.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
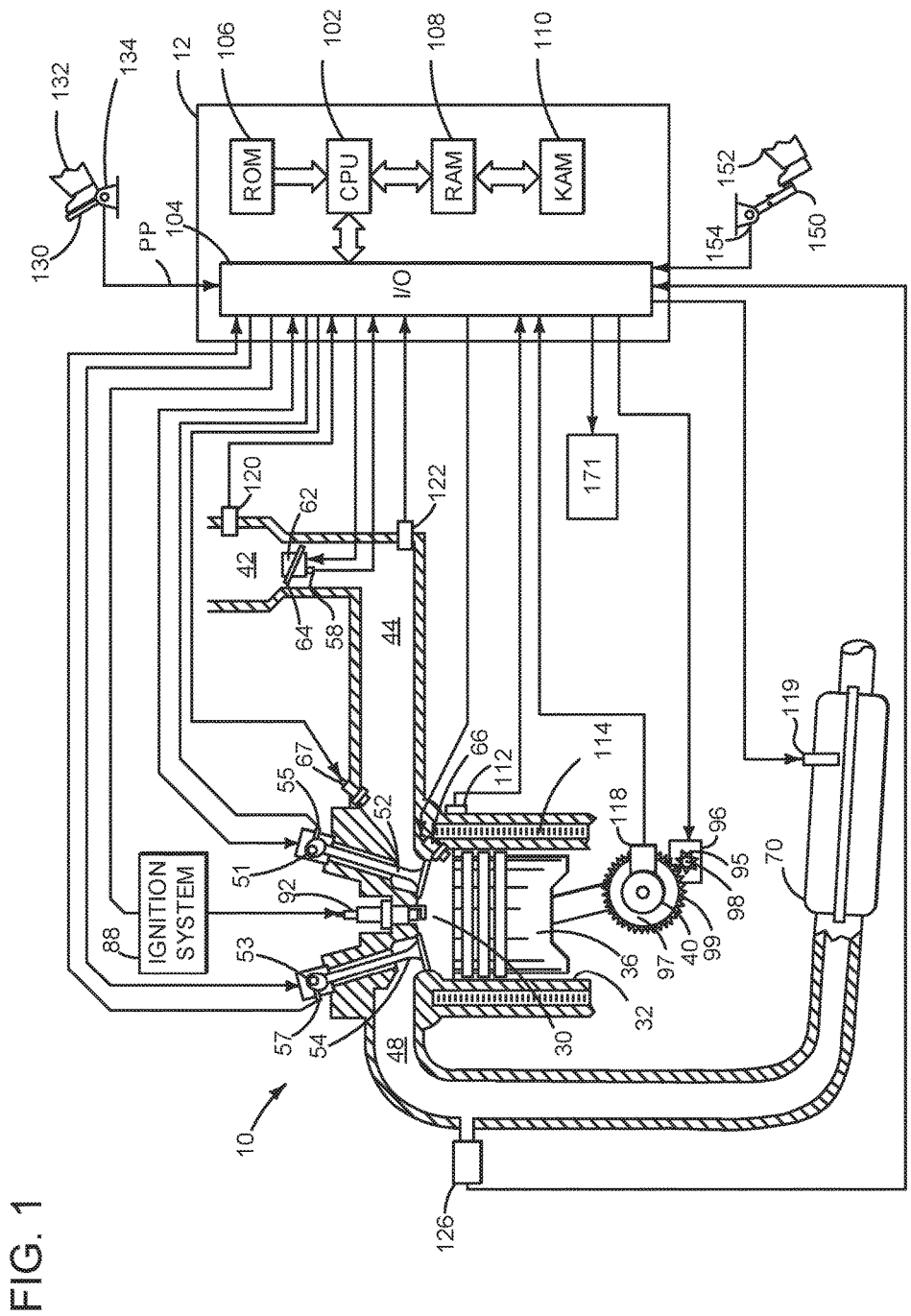
FIG. 1 shows a schematic depiction of an internal combustion engine.
Figure 2:
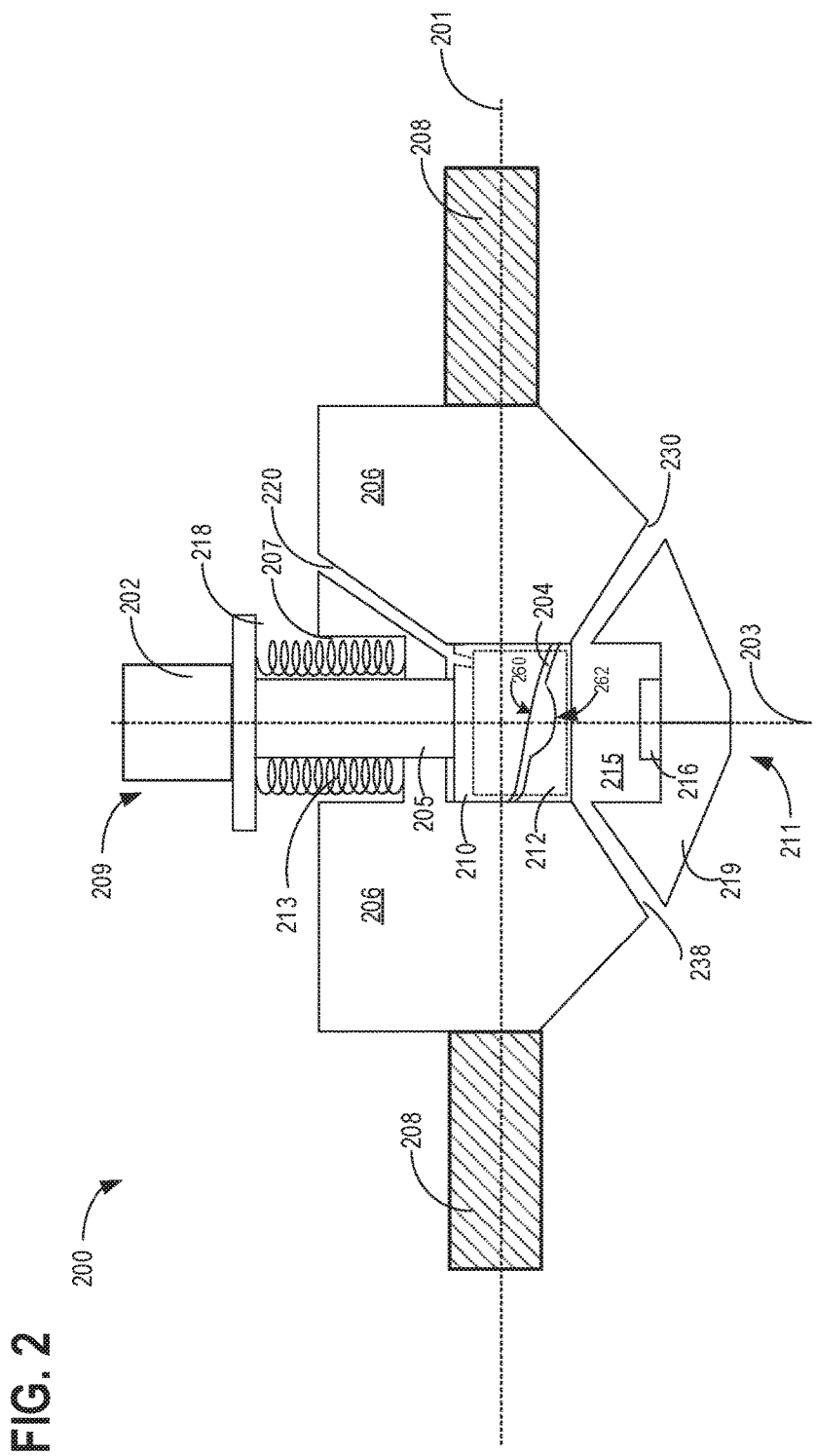
FIG. 2 shows an example of a direct fuel injector assembly used in the engine of FIG. 1 in a deactivated position.
Figure 3:
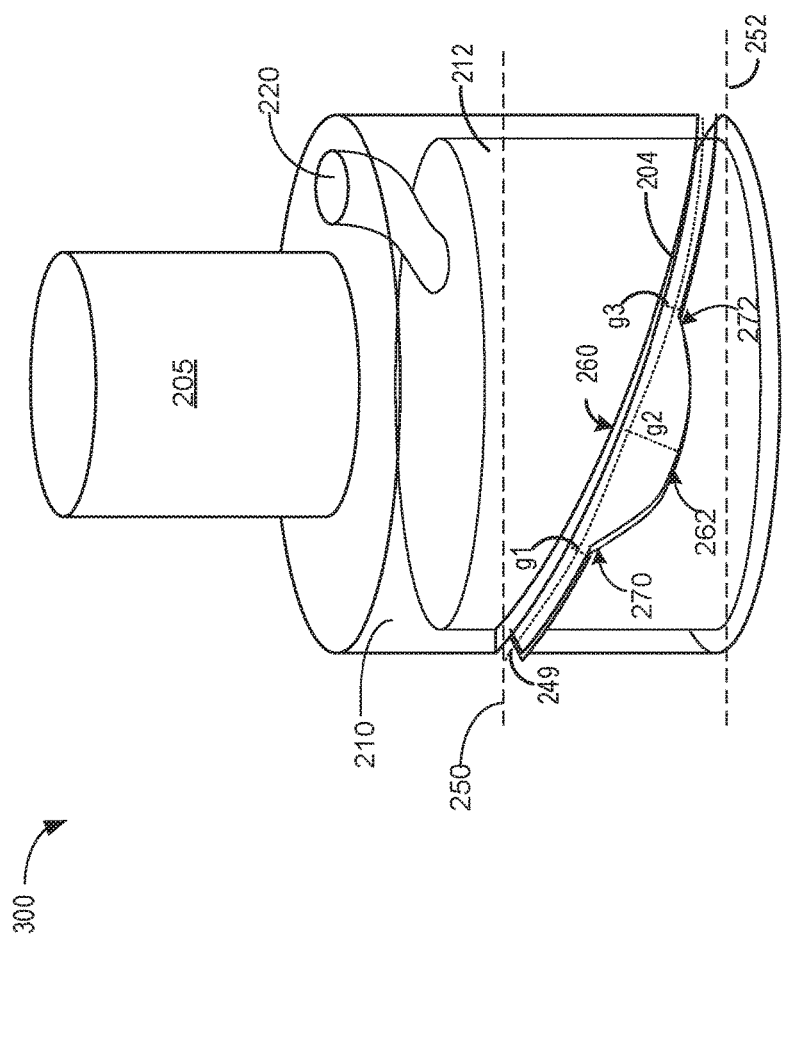
FIG. 3 illustrates an injector needle with an injector pin having a curved fuel channel of non-uniform width around an outer circumference of the injector needle pin.
Figure 4:
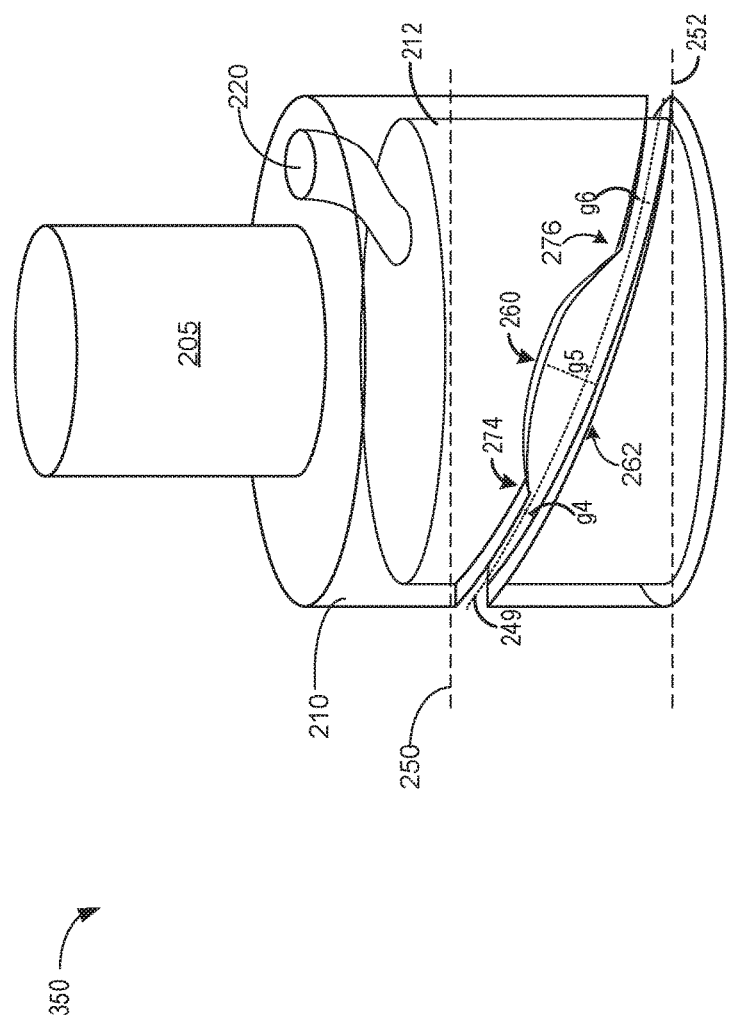
FIG. 4 illustrates another embodiment an injector needle with an injector pin.
Figure 5:
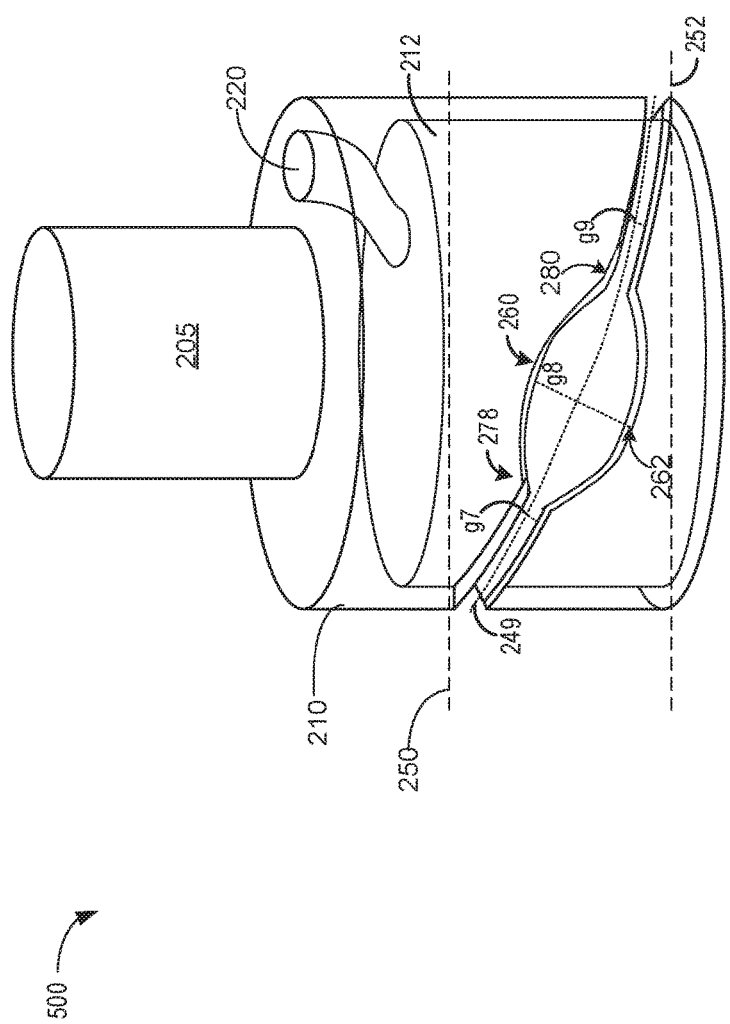
FIG. 5 illustrates another embodiment an injector needle with an injector pin.
Figure 6:
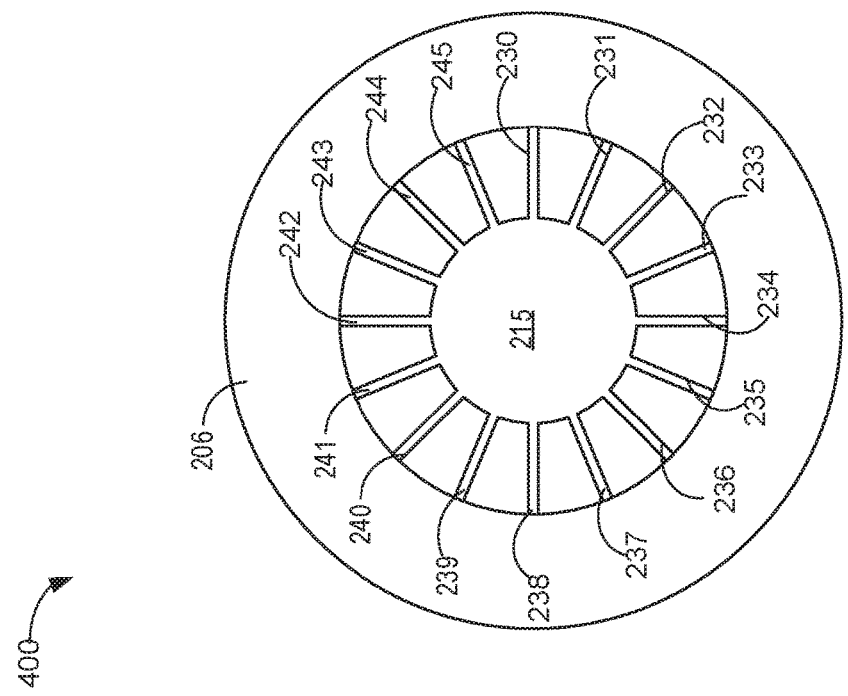
FIG. 6 shows a bottom up view of an injector nozzle with sixteen nozzle holes radially arranged around a center chamber of the fuel injector of FIG. 2.
Figure 7:
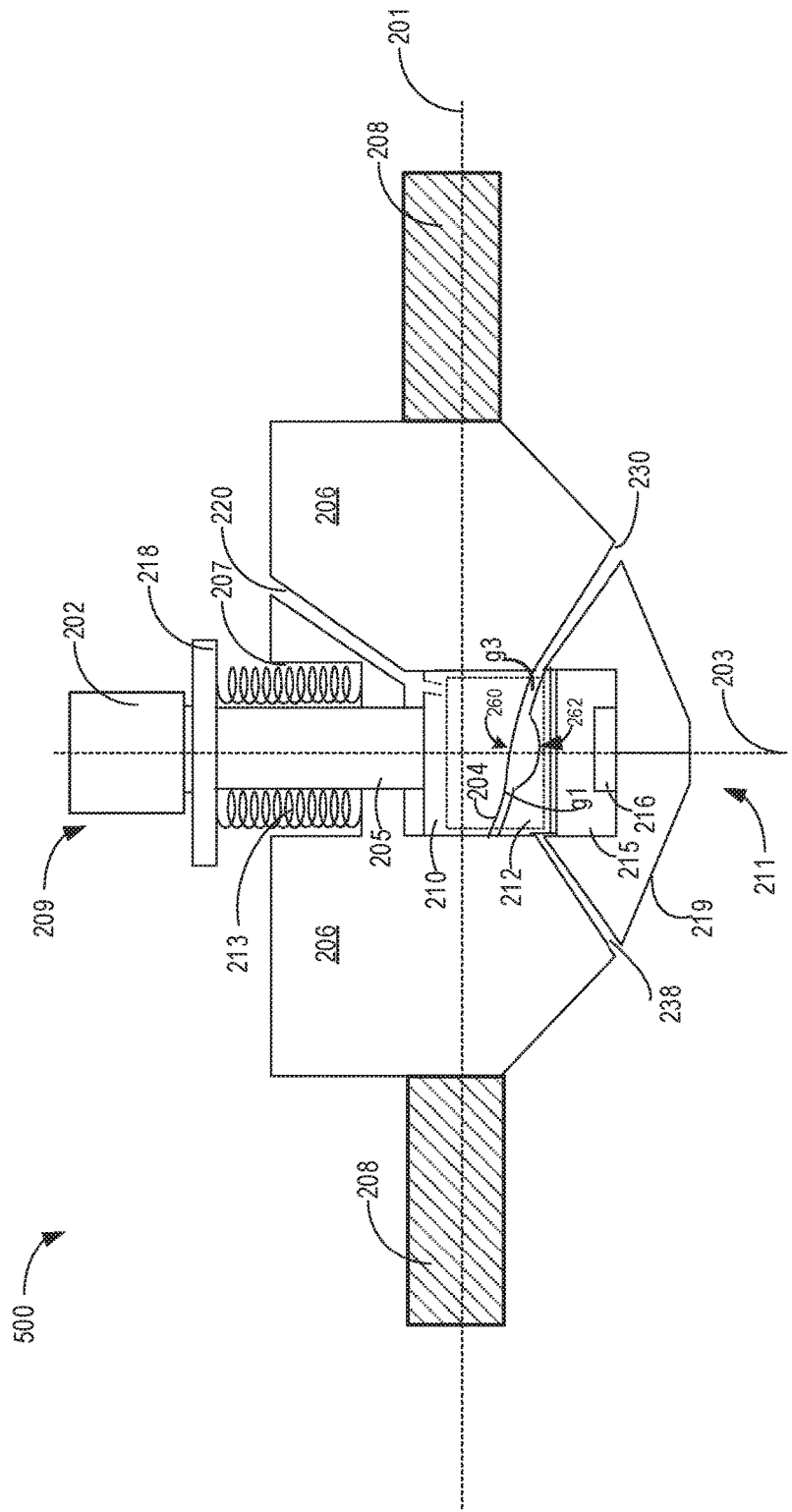
FIG. 7 shows the direct fuel injector assembly of FIG. 2 in a second position.
Figure 8:
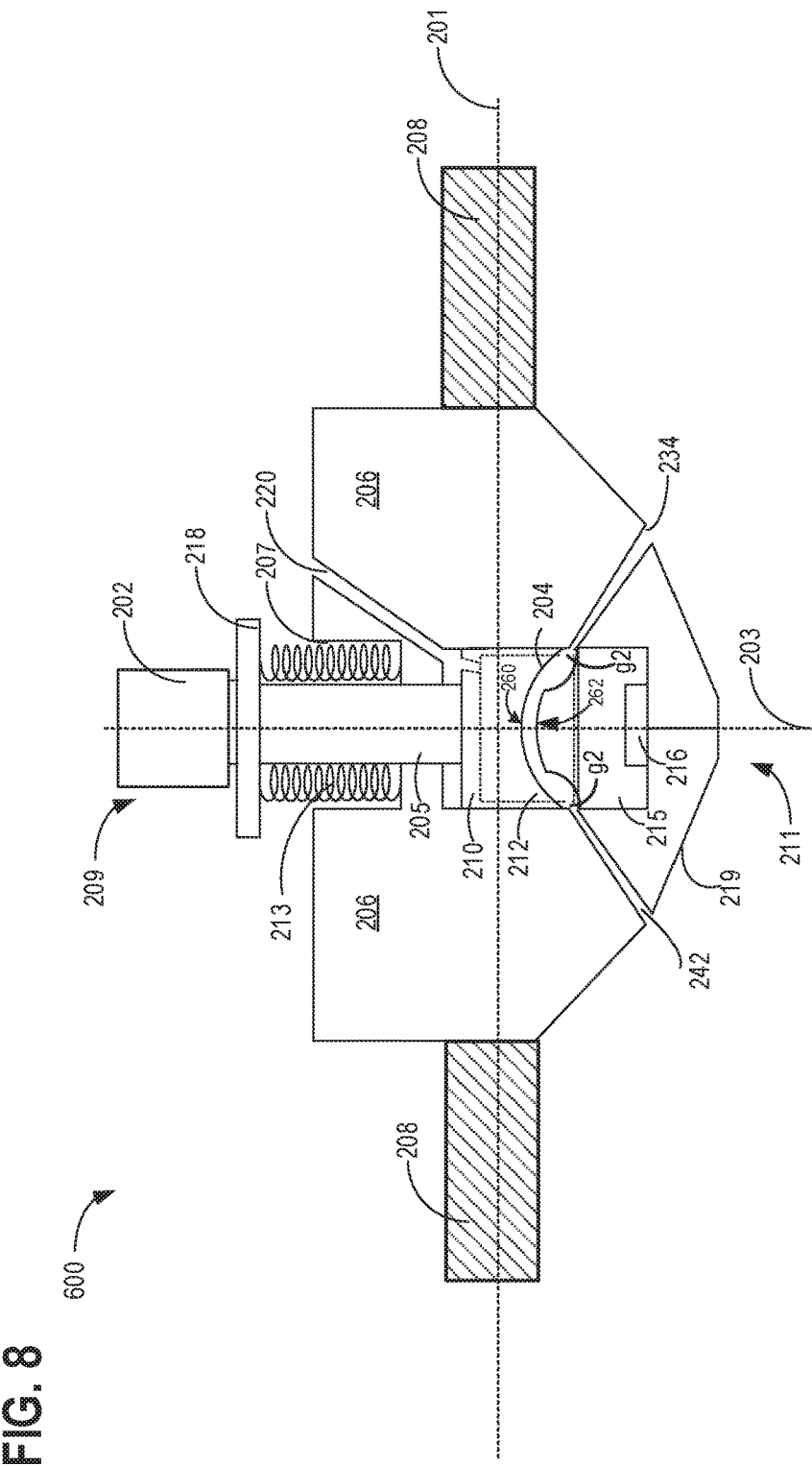
FIG. 8 shows the direct fuel injector assembly of FIG. 2 in a sixth position.
Figure 9:
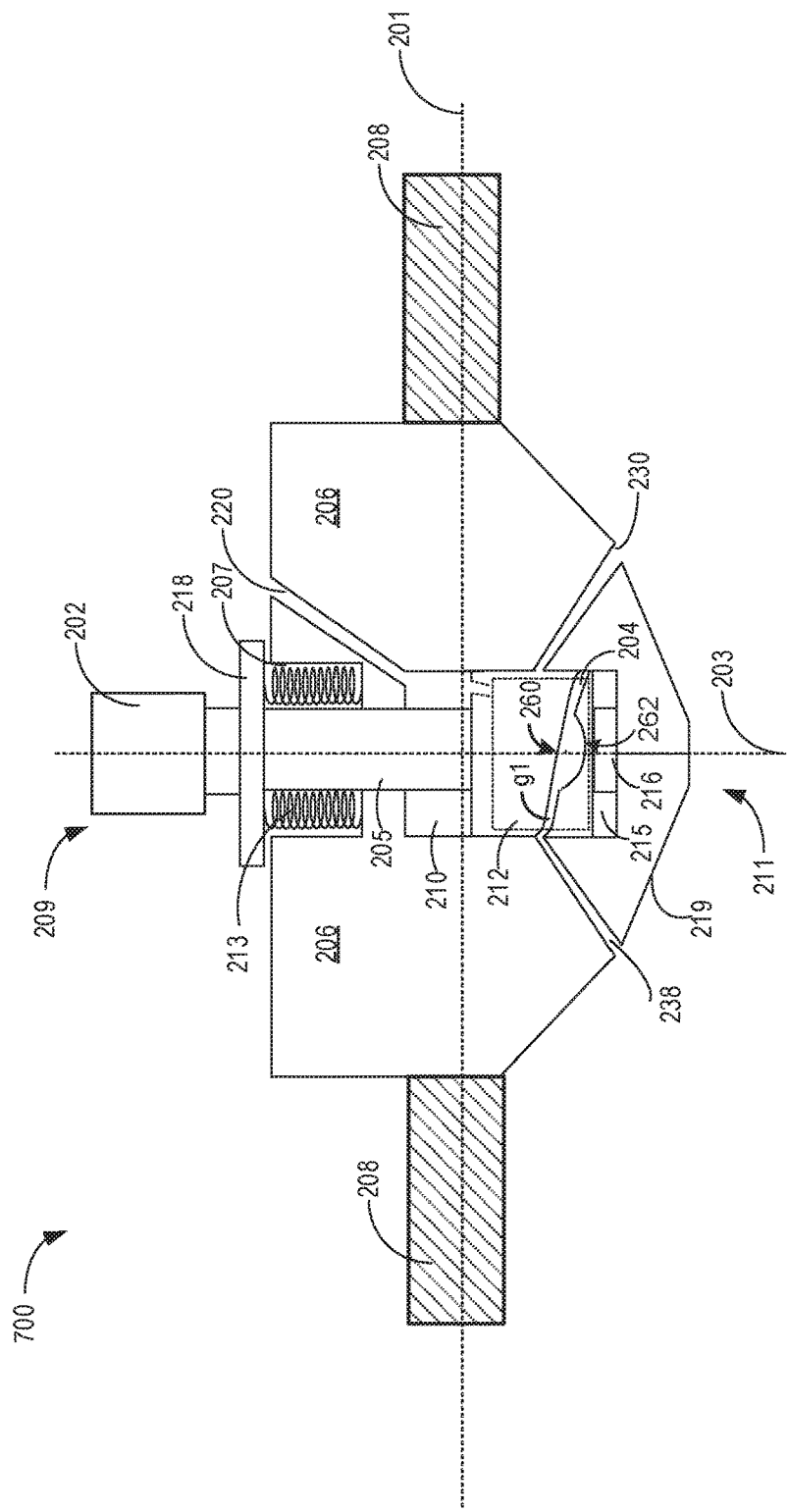
FIG. 9 shows the direct fuel injector assembly of FIG. 2 in a tenth position.
Figure 10:
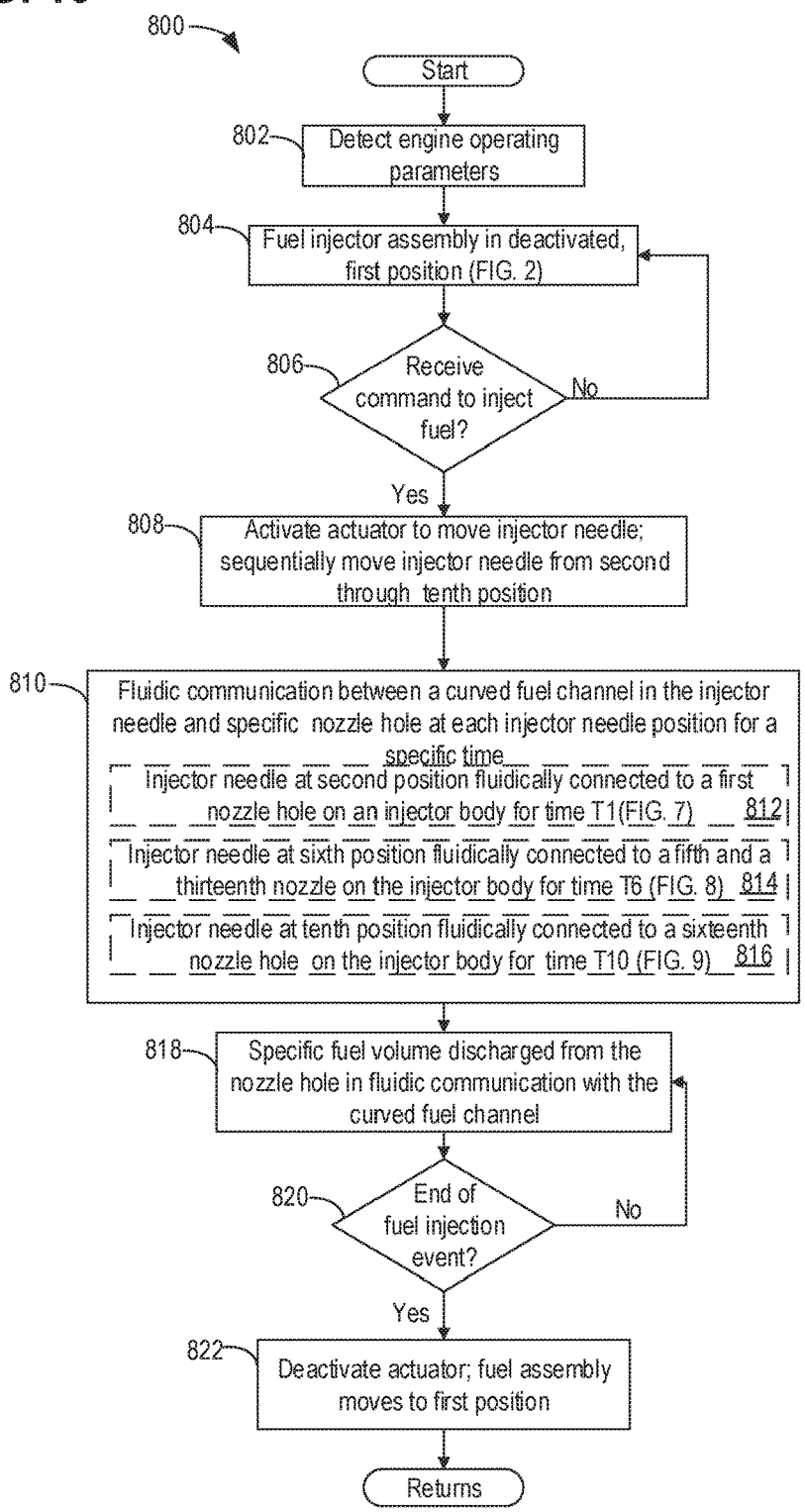
FIG. 10 is a flowchart showing a method for operating the direct fuel injector assembly of FIG. 2.

The following description relates to systems and methods for operating a direct fuel injector, which may be incorporated in an engine as shown in FIG. 1. FIG. 2 shows an embodiment of a fuel injector assembly with multiple nozzle holes and an injector needle with a curved fuel channel of non-uniform width. The sequential positioning of the injector needle may fluidically connect the fuel channel to a specific nozzle hole, enabling fuel injection through that nozzle hole. FIGS. 3, 4, and 5 show different embodiments of the injector needle with the curved fuel channel of non-uniform width, and FIG. 6 shows the fuel injector nozzle holes. The position of the injector needle is regulated by an actuator and by retention springs coupled to the injector needle. In FIG. 2, the fuel injector assembly is in a deactivated position. In FIGS. 7, 8 and 9, the fuel injector assembly is in a second, a sixth, and a tenth activated position, respectively, where a different volume of fuel may be delivered at each position. The volume of fuel delivered at each position may be based on the duration for which each activated position is held, and based on the width of the curved fuel channel in apposition with the specific nozzle hole at each position. In one example, more fuel volume may be delivered in a region with more turbulent air flow with in a combustion chamber of the engine, while less fuel volume may be delivered in areas with less turbulence, resulting in enhanced fuel spray atomization in all regions of the combustion chamber. An engine controller may send control signals to an electric actuator coupled to a needle of the direct fuel injector to adjust the position of the nozzle and associated pin, as shown in FIG. 2 and FIGS. 7-9. The controller may perform a control routine, such as the example routine of FIG. 10, to transition the nozzle from a default deactivated position where all injector nozzle holes are closed, to sequentially positioning the injector needle where specific injector nozzle holes are injecting fuel for a specified duration at each position, delivering different fuel volumes to different regions of the combustion chamber of the engine. FIG. 10 depicts a method for injecting fuel by the fuel injector assembly described with reference to FIGS. 2-9. Fluidic communication between a curved fuel channel and a nozzle hole based on a width of the fuel channel is illustrated in schematics shown in FIG. 11.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a deactivated state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Direct fuel injector 66 is shown positioned to inject fuel directly into cylinder 30, which is known to those skilled in the art as direct injection. Fuel injector 66 delivers liquid fuel in proportion to a voltage pulse width or fuel injector pulse width of a signal from controller 12. Fuel is delivered to fuel injector by a fuel system (not shown) including a fuel tank, fuel pump, and fuel rail (not shown). In addition, intake manifold 44 is shown communicating with optional electronic throttle 62, which adjusts a position of throttle plate 64 to control airflow from air intake 42 to intake manifold 44. Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including, microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine with multiple fuel injectors. Further, controller 12 may communicate conditions such as degradation of components to light, or alternatively, display panel 171.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder to increase the volume within combustion chamber 30. The air flow in the combustion chamber 30 through the intake valve 52 may result in high turbulence, tumble and swirl in some parts of the combustion chamber, while less swirling, tumbling, and turbulence may be seen in other locations of the combustion chamber.

The position at which piston 36 is near the bottom of the cylinder and at the end of the intake stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

As explained above, a direct fuel injector may be used to supply fuel directly to a cylinder of an engine, as shown in FIG. 1. To increase atomization of the fuel, direct injectors may include a plurality of holes through which the fuel is supplied. Because the fuel is supplied to the direct injector at a high pressure, the fuel is typically injected from the direct injector with relatively high force. This may cause fuel spray interaction as the fuel is discharged through multiple injector holes, resulting in reduced fuel spray atomization, which may eventually compromise emissions.

Additionally, air flow in the combustion chamber of an engine cylinder may not be uniform in all regions. Hence, a same volume of fuel may be atomized differently in different regions of the combustion chamber (for example, more fuel spray atomization in regions with high tumble and swirl and less fuel spray atomization in regions of the combustion chamber with less turbulence). According to embodiments described below, a fuel injector may have an injector needle configured to sequentially move through multiple positions and establish fluidic connection with different nozzles holes for different durations, such that at each position a different volume of fuel is injected through only specific nozzle hole/s of a multi-hole nozzle injector, thus eliminating fuel spray interaction and increasing fuel spray atomization.

Referring to FIG. 2, an example of a fuel injector assembly 200 in an engine cylinder 208 is illustrated. The fuel injector assembly 200 may be one non-limiting example of injector 66 of FIG. 1. The fuel injector assembly 200 includes an injector body 206 housing an injector needle 205 with an injector pin 210 in a movable manner along a longitudinal axis 203 of the injector body 206 (also referred to a center axis of the injector body). The injector body 206 also houses a fuel passage 220 coupled to a fuel supply (e.g., a high pressure common fuel rail, fuel supply line(s), fuel pump(s), and fuel tank). An actuator 202 may be coupled to the injector needle 205. The actuator 202 may be an electric actuator. In other examples, the fuel injector may be actuated by other actuators, such as solenoid, piezoelectric, hydraulic, etc., without departing from the scope of this disclosure.

In the example illustrated in FIG. 2, the longitudinal axis 203 of the fuel injector assembly 200 is perpendicular to a transverse axis 201 of the cylinder 208 and of the injector body. However, in other examples the injector may be positioned at a different relative to the transverse axis of the cylinder. The fuel injector assembly 200 includes a base end 211 positioned interior the cylinder 208 into which the fuel may be injected. The fuel injector assembly 200 also includes a top end 209, opposite the base end 211.

The fuel injector body 206 includes a central passage 207 connecting to a center chamber 215 housing the fuel injector needle 205 with the injector pin 210, as illustrated in FIG. 2. The fuel injector needle 205 along with the injector pin 210 is movable in a downward direction or in an upward direction in the central passage 207 and the center chamber 215 of the injector body 206. The fuel injector needle 205 is also coupled to a pair of retention springs 213. Each retention spring 213 coupled to the injector needle 205 may insert and anchor to a surface in the central passage 207 of the fuel injector body 206 and act to bias the injector needle 205 in an upward direction along the longitudinal axis 203 (e.g., away from the cylinder 208). The actuator 202 may move the injector needle 205 along the longitudinal axis 203 in a downward direction (e.g., toward the cylinder 208), against the force of the springs. A stop guide 218 attached to the top of the injector needle 205 may restrict the downward motion of the injector needle when the stop guide 218 is in face sharing contact with the injector body 206, as will be described below with reference to FIG. 9.

The fuel injector needle 205 with the injector pin 210 may be housed inside the central passage 207 and the center chamber 215. The injector pin 210 may be in face sharing contact with the inner surface of the center chamber 215 as the injector pin 210 along with the injector needle 205 moves downward or upward along the longitudinal axis 203. The injector pin 210 may be cylindrical and may include a fuel reservoir 212 and a curved fuel channel 204 of non-uniform width around the circumference on the outer surface of the injector pin 210, as illustrated in an embodiment 300 in FIG. 3, and in embodiments 350 and 400 in FIGS. 4 and 5, respectively. The curved fuel channel 204 may include a top surface 260 and a bottom surface 262, which will be discussed further with reference to FIGS. 3-5.

The fuel reservoir 212 may be connected to the fuel passage 220 inside the injector body 206, which fuel passage 220 may be fluidically coupled to a high pressure fuel system. The fuel reservoir 212 may be in fluidic communication with the curved fuel channel 204 along the length of the curved fuel channel 204. The curved fuel channel 204 may be fluidically open to the center chamber 215 along the length of the curved fuel channel. In one example, the curved fuel channel 204 may comprise an opening in the wall of the pin that traverses around an entirety of the pin. A tight, face-sharing contact between the injector pin 210 and the inner wall of the center chamber 215 may prevent fuel from exiting the curved fuel channel 204 into the center chamber 215.

Referring to FIG. 3, the curved fuel channel 204 may curve downwards from a high plane 250 to a lower plane 252 along the outer surface of the injector pin 210. The curve of the fuel channel from the high plane 250 towards the low plane 252 may be symmetrical on either side of the high plane 250, wherein the curved fuel channel 204 may symmetrically encircle the outer surface of the injector pin 210. The relative positioning of the high plane 250 and the low plane 252 on the injector pin 210 may determine the curvature/slope of the curved fuel channel 204 encircling the injector pin 210. The curved fuel channel 204 may curve around the entirety of the pin, e.g., it may curve 360 degrees around the circumferential surface of the pin. A center axis 249 along a length of the curved fuel channel 204 y have a first point of symmetry at the high plane 250 that represents the maximum vertical displacement of the curved fuel channel relative to the bottom of the pin. The center axis 249 of the curved fuel channel 204 channel may have a second point of symmetry at the low plane 252 that represents the minimum vertical displacement of the curved fuel channel relative to the bottom of the pin, and the maximum and minimum vertical displacements may be different.

The center axis 249 along the length of the curved fuel channel 204 may be angled relative to a transverse axis of the injector pin, as shown in FIG. 3. The low plane 252 may be parallel to the transverse axis and at the low plane, the center axis 249 of the fuel channel may be angled at an angle greater than zero, such as angle of 15-30 degrees. The center axis 249 of the curved fuel channel may include a first half, from the first point of symmetry to the second point of symmetry that is shaped as half of a turn of a helix in a downward direction. The center axis 249 of the curved fuel channel may include a second half, from the second point of symmetry back to the first point of symmetry that is shaped as half of a turn of a helix in an upward direction. Along the first half and the second half of the center axis 249 of the curved fuel channel, a width of the curved fuel channel may vary, as will be described below.

In the first half of the center axis 249 of the curved fuel channel 204, from the first point of symmetry to the second point of symmetry, the top surface 260 of the curved fuel channel may be parallel to the bottom surface 262, except at an area where the bottom surface 262 may curve away from the top surface 260, and may then curve back towards the top surface 260. In one example, a gap g1 between the top surface and the bottom surface of the curved fuel channel from the first point of symmetry at the high plane 250 to a point 270 of the curved fuel channel 204 may be present. As the curved fuel channel further approaches towards the second point of symmetry at the low plane 252 from the point 270, the bottom surface 262 may gradually move away from the top surface 260, such that the gap g1 separating the top surface and the bottom surface increases to a gap g2, where the gap g2 may be greater than the gap g1, and the gap g2 may be the largest distance separating the top surface from the bottom surface. As the curved fuel channel moves further towards the low plane 252, the bottom surface may gradually approach the top surface 260, such that the gap g2 gradually decreases to a gap g3 at a point 272 along the curved fuel channel 204. From the point 272 to the second point of symmetry at the low plane 252, the bottom surface and the top surface may remain at the gap g3 from each other, where g3 may be equal to g1, and g3 may be less than g2. In one example, the increase from the gap g1 to the gap g2 and the decrease from the gap g2 to gap g3 may be symmetrical.

The distance between the top surface 260 and the bottom surface 262 may have a symmetrical pattern on either side of the high plane and the low plane. In one example, the second half of the center axis 249 of the curved fuel channel, from the second point of symmetry back to the first point of symmetry (shaped as half of a turn of a helix in an upward direction), the orientation, and relative distance between the top surface and the bottom surface may be similar to the first half of the center axis 249 of the curved fuel channel 204. In one example, the point 270 and the point 272 may be located in other areas of the curved fuel channel, such that the widest gap g2 between the top surface and the bottom surface corresponds to (e.g., fluidically couples to) one or more nozzle holes of the fuel injector that are positioned to inject fuel to an area where high swirl and tumble is generated inside a combustion chamber.

In one example, the gap g2 may be present only on one side of the curved fuel channel 204. In another example, the point 270 and the point 272 along with the gap g2 of the curved fuel channel 204 may be present in more than one location on the same side of the curved fuel channel, where the location of each section of the curved fuel channel between the point 270 and the point 272 may correspond to nozzle holes that fluidically couple to an area of high tumble and swirl area of the combustion chamber.

FIG. 4 shows an embodiment 350 of the injector needle, similar to the embodiment 300 described above with reference to FIG. 3, except for the relative orientation of the top surface and the bottom surface of the curved fuel channel. In the embodiment 350, in the first half of the center axis 249 of the curved fuel channel 204, there is a gap g4 between the top surface and the bottom surface from the high plane 250 up to a point 274 of the curved fuel channel. At the point 274, the top surface may gradually move away from the bottom surface, the gap g4 increasing to a gap g5 between the top surface and the bottom surface, where the gap g5 may be greater than the gap g4, and where the gap g5 may be the widest gap between the top surface and the bottom surface. The top surface may move back gradually towards the bottom surface, and at a point 276 of the curved fuel channel, the gap g5 decreases to a gap g6, where the gap g6 may be equal to the gap g4. A similar orientation of the top surface and the bottom surface may be present along the second half of the center axis 249 of the curved fuel channel. In other examples, the point 274 and the point 276 may be located in other areas of the curved fuel channel 204, such that the widest gap g5 between the top surface and the bottom surface corresponds to (e.g., fluidically couples to) one or more nozzle holes of the fuel injector that are positioned to inject fuel to an area where high swirl and tumble is generated inside a combustion chamber.

In one example, the gap g5 may be present only on one side of the curved fuel channel 204. In another example, the point 274 and the point 276 along with the gap g5 of the curved fuel channel 204 may be present in more than one location on the same side of the curved fuel channel 204, where each section of the curved fuel channel between the point 274 and the point 276 may correspond to nozzle holes that fluidically couple to an area of high tumble and swirl area of the combustion chamber.

FIG. 5 shows another embodiment 500 of the injector needle, similar to the embodiments 300 and 350 described above with reference to FIGS. 3 and 4, except for the relative orientation of the top surface 260 and the bottom surface 262 of the curved fuel channel 204. In the embodiment 500, in the first half of the center axis 249 of the curved fuel channel 204, there may be a gap g7 between the top surface 260 and the bottom surface 262 from the high plane 250 to a point 278 of the curved fuel channel. At the point 278, both the top surface 260 and the bottom surface 262 may gradually move away from each other, and the gap g7 may increase to a gap g8, where the gap g8 is greater than the gap g7, and the gap g8 is the largest gap between the top surface and the bottom surface. The top surface and the bottom surface may then gradually move towards each other, and at a point 280 of the curved fuel channel, the gap g8 decreases to a gap g9, where the gap g9 may be equal to the gap g7. The gap g9 continues from the point 280 to the low plane 252. A similar orientation of the top surface and the bottom surface may be present along the second half of the center axis 249 of the curved fuel channel. In other examples, the point 278 and the point 280 may be located in other areas of the curved fuel channel 204, such that the widest gap g8 between the top surface and the bottom surface corresponds to (e.g., fluidically couples to) one or more nozzle holes of the fuel injector that are positioned to inject fuel to an area where high swirl and tumble is generated inside a combustion chamber The gap g8 may be present only on one side of the curved fuel channel 204 in one embodiment. In another embodiment, the point 278 and the point 280 along with the gap g8 of the curved fuel channel 204 may be present in more than one location on the same side of the curved fuel channel 204, where each section of the curved fuel channel between the point 278 and the point 280 may correspond to nozzle holes that fluidically couple to an area of high tumble and swirl area of the combustion chamber.

Thus, a larger gap of the curved fuel channel through specific nozzle holes may correspond to regions inside combustion chamber where more fuel quantity may be desired due to higher swirling, tumbling and turbulent flow, and a smaller gap of the curved fuel channel through specific nozzle holes may correspond to regions inside the combustion chamber where less fuel quantity is desired due to less swirling, tumbling and turbulent flow. In one example, the lower surface of the curved channel may be parallel to a circumferential direction, while the upper surface may be deviated from the circumferential direction to create various channel widths for longer or shorter injection duration. In another example, the upper surface of the curved channel may be parallel to the circumferential direction, while the lower surface deviated from the circumferential direction to create various channel widths for longer or shorter injection duration. In a further example, both the upper and lower surfaces of the curved channel may be deviated from the circumferential direction to create various channel widths for longer or shorter injection duration.

By including a bottom surface that curves away from the top surface, as in the embodiment illustrated in FIG. 3, a "later" fuel injection event for the nozzle hole(s) configured to fluidically couple to the curved fuel channel at the wide gap (e.g., g2) may be provided. In other words, the injection of fuel from the nozzle hole(s) configured to fluidically couple to the curved fuel channel at the wide gap may commence at a timing consistent with fuel injection of the other nozzle holes configured to fluidically couple to the curved channel at the narrower gap g1 (e.g., once fuel injection for a prior nozzle hole has ended), and the duration of the injection of fuel from the nozzle hole(s) configured to fluidically couple to the curved fuel channel at the wide gap may extend closer to or overlap with fuel injection of a subsequent nozzle hole. In contrast, by including a top surface that curves away from the bottom surface, as in the embodiment illustrated in FIG. 4, an "earlier" fuel injection event for the nozzle hole(s) configured to fluidically couple to the curved fuel channel at the wide gap (e.g., g5) may be provided. In other words, the injection of fuel from the nozzle hole(s) configured to fluidically couple to the curved fuel channel at the wide gap may commence at a timing earlier than fuel injection of the other nozzle holes configured to fluidically couple to the curved channel at the narrower gap g4 (e.g., closer to or overlapping with fuel injection for a prior nozzle hole), and the injection of fuel from the nozzle hole(s) configured to fluidically couple to the curved fuel channel at the wide gap may end at a timing consistent with the other nozzle holes (e.g., the fuel injection may end before fuel injection of a subsequent nozzle hole begins). By including curvature of both the top surface and the bottom surface, as in the embodiment illustrated in FIG. 5, the duration of fuel injection from the nozzle hole(s) configured to fluidically couple to the curved fuel channel at the wide gap (e.g., g8) may be longer than fuel injection from equivalent nozzle holes in the embodiments illustrated in FIGS. 3 and 4, and the fuel injection event may commence early and end late.

Referring back to FIG. 2, the fuel injector body 206 includes an injector nozzle base 219 at the fuel injector base end 211. A needle seat 216 may project from the injector nozzle base 219 into the center chamber 215. The needle seat 216 may come in face sharing contact with the injector pin 210 housed inside the center chamber 215. A plurality of nozzle holes connect the center chamber 215 of the fuel injector to the outside of the fuel injector body 206, such as nozzle holes 238 and 230.

FIG. 6 shows a schematic bottom-up view of the fuel injector body 206 with sixteen nozzle holes, 230-245, fluidically connecting the center chamber 215 to the outside of the fuel injector body 206. The sixteen nozzle holes 230-245 may be radially arranged around the center chamber 215. In other examples, more than sixteen or less sixteen nozzle holes may be present. The distribution of the nozzle holes around the center chamber 215 may be symmetrical with similar distance between each of the consecutive nozzle holes. In another example, the arrangement of nozzle holes around the center chamber may not be symmetrical. The nozzle holes may traverse through the injector body 206 at an angle relative to the longitudinal axis 203, for example the nozzle holes 230 and 238 may be at an angle of 60° relative to the longitudinal axis 203. The nozzle holes 230-245 may be arranged in a single vertical plane, as illustrated. However, in other examples, the nozzle holes may arranged in two or more vertical planes.

FIG. 2 shows the fuel injector assembly 200 in a deactivated first position (where no fuel injection occurs), wherein the actuator 202 is not activated, and the retention springs 213 bias the injector needle 205 upwards. The injector pin 210 is not in face sharing contact with the injector needle seat 216 and the curved fuel channel 204 is not in fluidic communication with any of the nozzle holes of the sixteen nozzle holes 230-245 of fuel injector (illustrated in FIG. 6), including no fluidic communication between the curved fuel channel and the nozzle holes 230 and 238, as illustrated in FIG. 2. Accordingly, fuel is blocked from exiting through the curved fuel channel 204 to any of the nozzle holes 230-245 and no fuel injection occurs.

FIG. 7 shows the fuel injector assembly 200 including the embodiment 300 of the injector needle of FIG. 3 in a second position 500 wherein the actuator 202 is activated and moves the injector needle 205 and the injector pin 210 downward (e.g., towards the cylinder) against the force of the retention springs 213. The downward movement of the injector needle 205 may be at a constant or a near constant velocity, and as the needle moves downward at the constant velocity, it may sequentially establish fluidic contact between various regions of the curved fuel channel 204 and specific nozzle hole/s.

In the second position 500 illustrated in FIG. 7, the injector pin 210 moves downward inside the center chamber 215, fluidically connecting the curved fuel channel 204 to the nozzle hole 230, establishing high pressure fuel flow from the fuel reservoir 212 of the injector pin 210, through the curved fuel channel 204, and through the nozzle hole 230 to the outside of the injector body and into the cylinder 208. During fuel injection, a region of the curved fuel channel 204 with the gap g3 between the top surface 260 and the bottom surface 262 may be aligned with the nozzle hole 230 for a duration T1. The volume of fuel delivered through the nozzle hole 230 into the engine cylinder may be determined by the volume of fuel exiting through the gap g3 to the nozzle hole 230 during the duration T1. In the second position, fluidic communication between the curved fuel channel and all other nozzle holes may be blocked (e.g., fuel injection occurs only via the nozzle hole 230).

The actuator may subsequently move the injector needle 205 further downward at constant or near constant velocity, to a third position (not shown), such that the fluidic connection between the curved fuel channel 204 and the nozzle hole 230 is blocked, while simultaneously, fluidic communication is established between at least one other nozzle hole and the curved fuel channel at a different plane of the curved fuel channel. Because the open curved fuel channel is present along the circumference of the injector pin 210 and is symmetrically curved, in certain injector needle positions the curved fuel channel may be in fluidic communication with two nozzle holes, for example, in the third position, the curved fuel channel 204 may be in fluidic communication with the nozzle hole 231 and the nozzle hole 245 for a defined period of time (the nozzle holes are shown in FIG. 6). In the third position, fuel may be injected only though the nozzle holes 231 and 245 for a specific duration discharging a specific volume of fuel in an area of the combustion chamber, while other nozzle holes do not have fluidic communication with the curved fuel channel 204. In one example, if the width of the fuel channel in apposition with the nozzle hole 231 and the nozzle hole 245 is more than the width of the fuel channel in apposition with the nozzle hole 230 during the second position, as the injector needle is moving downward inside the injector body, the duration for which fluidic communication is established between the curved fuel channel and with each of the nozzle holes 231 and 245 may be for a longer duration than a duration of fluidic communication with the nozzle hole 230. Hence, a volume of fuel discharged during the second position from the nozzle hole 230 may be less than a volume of fuel discharged during the third position from each of the nozzle holes 231 and 245. In another example, the width of the curved fuel in apposition with the nozzle hole 230 in the second position and with each of the nozzle hole 231 and 245 during the third position may be same. The duration of fluidic communication between the curved fuel channel and between each of the nozzle holes may be same in both the second position and the third position, resulting in discharge of the same volume of fuel from each of the nozzle holes. Fuel discharge during the third position may be in an area of the combustion chamber, which may be at least partly different from an area where fuel is discharged during the second position.

Subsequently the actuator may continue moving the injector needle 205 and the injector pin 210 downwards at constant or near constant velocity along the center chamber 215, to a fourth position (where the curved fuel channel 204 connects to the nozzle holes 232 and 244), followed by a fifth position (where the curved fuel channel 204 connects to the nozzle holes 233 and 243), and specific fuel volume(s) are discharged through the respective nozzle holes at each position (positions not shown). The fuel volume discharged in each of the positions may depend on the width of the curved fuel channel in apposition with the specific nozzle hole. If the width of the curved fuel channel is relatively large, the duration of fluidic communication between the specific nozzle hole and the fuel channel during a downward or an upward movement of the injector needle will be longer, discharging more fuel volume compared to when the width of the fuel channel communicating with the nozzle hole is relatively small.

Moving the injector needle 205 further downwards at constant or near constant velocity, the injector needle may be in a sixth position 600, establishing fluidic communication and fuel flow though the nozzle holes 234 and 242, as shown in FIG. 8. In the sixth position, the curved fuel channel with a wider gap than the gap g1 and the gap 3 may be in apposition with the nozzle hole 234 and the nozzle hole 242. In one example, regions of the curved fuel channel 204 with the gap 2 (illustrated in FIG. 3) may be in apposition with the nozzle holes 234 and 242. The duration of fluidic communication between the curved fuel channel and the nozzle hole 234 and the nozzle hole 242 at the sixth position may be for a duration T6. In one example, the duration T6 may be more than the duration T1 of the second position (discussed above with reference to FIG. 7) and the other durations for which fluidic communication is established between the curved fuel channel and the specific nozzle holes during the other fuel injector positions.

In one example, the gap g2 may be two times wider than the gap g1. During the downward movement of the injector needle, when the gap g2 comes in apposition with the nozzle holes 234 and 242, the duration of fluidic communication with each of the nozzle holes 234, 242 will be longer than the duration of fluidic communication between the gap g1 and the nozzle hole 230 during the second position. Thus, at the sixth position a larger volume of fuel may be delivered through each nozzle hole compared to the fuel delivered in the second position. The fuel delivered through the nozzle holes 234 and 242 may be delivered to a region or regions of the combustion chamber corresponding to an area of high tumble and swirl inside the combustion chamber of the engine during the intake stroke and/or compression stroke.

In one example, a sixth volume of fuel injected through each of the nozzle holes 234 and 242 may be a maximum volume of fuel injected through any of the sixteen nozzle holes of the fuel injector. For example, the sixth volume of fuel injected may be more than a first volume of fuel injected through the nozzle hole 230, may be more than a second volume of fuel injected through each of the nozzle holes 231 and 245, may be more than a third volume of fuel injected through each of the nozzle holes 233 and 243, and may be more than a fourth volume of fuel injected through each of the nozzle holes 234 and 242. In some examples, each of the first volume of fuel, second volume of fuel, third volume of fuel, and fourth volume of fuel may be equal volumes of fuel.

Depending on the location of the gap g2 along the curved fuel channel, each of the corresponding nozzle holes delivering a maximum volume of fuel may be present on opposite sides of the injector nozzle, or may be present on the same side of the injector nozzle. In one example, the two nozzle holes, each delivering the maximum volume of fuel, may be next to each other when the gap g2 extends along a length on the same side of the curved fuel channel. The gap g2 may establish fluidic communication with each nozzle hole during consecutive open positions of the fuel injector needle.

In a further example, each of the nozzle holes delivering the maximum fuel volume may be separated by a few nozzle holes (e.g., two nozzle holes) in between them, such as the gap g2 may be present at a first region and at a second region on the same side of the curved fuel channel. A third region of the curved fuel channel with less gap than the gap g2 may be present between the first region and the second region. The third region of the curved fuel channel with less gap than the gap g2 may correspond to the nozzle holes separating the two nozzle holes delivering the maximum volume of fuel. The fluidic communication of each region of the curved fuel channel with specific nozzle holes may happen during different open positions during the downward movement of the injector needle.

As another example, rather than including two regions of maximum width, only one region of maximum width may be included in the curved fuel channel. As such, in some examples, only one nozzle hole may deliver the maximum volume of fuel. Further, in some examples, one or more nozzle holes in proximity to the nozzle hole delivering the maximum volume of fuel may deliver an increased volume of fuel. For example, the region of maximum width (e.g., gap g2) of the fuel channel may be positioned to fluidically couple to nozzle hole 234 to deliver the maximum volume of fuel. Additionally, nozzle holes 233 and 235 may fluidically couple to the curved fuel channel at regions proximate the maximum width, where the width of the fuel channel may be less than the maximum width but greater than the minimum width (e.g., gap g1). Thus, the nozzle holes 233 and 235 may deliver an intermediate volume of fuel, less than the maximum volume of fuel delivered by nozzle hole 234 but greater than a minimum volume of fuel delivered by nozzle hole 230. As used herein, maximum and minimum volumes of fuel may refer to relative volumes of fuel for a given fuel injection event, and may be the maximum and minimum volumes of fuel delivered by any of the nozzle holes during that fuel injection event.

The actuator may continue moving the injector needle downward at the constant velocity, establishing fluidic communication at a seventh position with nozzle holes 235 and 241, at an eighth position with nozzle holes 236 and 240, at a ninth position with nozzle holes 237 and 239 (positions not shown). The injector may then be moved to a tenth position 700 fluidically connecting to nozzle hole 238.

FIG. 9 illustrates the fuel injector assembly 200 in the tenth position 700 with the curved fuel channel 204 fluidically coupled to the nozzle hole 238 while fluidic communication between the curved fuel channel and other nozzle holes may be blocked. The curved fuel channel at the gap g1 may be in apposition with the nozzle hole 238. The duration of fluidic communication between the curved fuel channel with the gap g1 and the nozzle hole 238 at the tenth position may be for a duration T10. In one example, the duration T10 may be less than the duration T6 for the sixth position (discussed above with reference to FIG. 8), and may be equal to the duration T1 for the second position (discussed above with reference to FIG. 7). In one example, the volume of fuel discharged during the tenth position may be equal to the volume of fuel injected during the second position (e.g., when the gap g1 and the gap g3 are equal). However, the fuel during the tenth position may be injected in an area of the combustion chamber different from the area of injection during the second position or during other positions of the injector needle.

In the tenth position, the injector needle stop guide 218 may be in face sharing contact with the injector body 206 and the needle seat 216 may be in face sharing contact with the injector pin 210 inside the center chamber 215, restricting any further downward movement of the injector needle 205 and the injector pin 210. While the fuel injector assembly 200 has been described herein has having ten positions including the deactivated position, in other examples, more or fewer positions of the fuel injector assembly may be present, depending on the number of nozzle holes. The fuel volume injected at each position may depend on the duration for which the position is retained and based on a width (gap between the top surface 260 and the bottom surface 262) of the curved fuel channel in apposition with the nozzle hole(s) at that position.

At the end of fuel injection, the actuator may be deactivated, and the retention springs 213 coupled to the injector needle may push the injector needle and the injector pin upward, away from the cylinder 208, moving the fuel injector assembly to the deactivated first position of FIG. 2. During the upward movement of the injector needle and the injector pin, the fuel injector may transition from the tenth position to the second position and finally to the deactivated first position. Moving back from the tenth position to the first position, a small volume of residual fuel may be discharged as each respective position re-establishes fluidic connection with the specific nozzle holes and the curved fuel channel. In one example, the duration of contact may be very short with minimal to no fuel discharge through the nozzle holes as the injector needle moves from the tenth to the first position.

The positions of the fuel injector assembly described above include the embodiment 300 of the injector needle (illustrated in FIG. 3). In other examples, the fuel injector assembly may include the embodiment 350 (FIG. 4) or the embodiment 400 (FIG. 5) of the injector needle.

Thus, a fuel injector includes a fuel injector body that includes a plurality of nozzle holes radially arranged around a center axis of the injector body. The injector body houses a needle coupled to a pin. The pin includes a fuel reservoir and a curved fuel channel in fluidic communication with the fuel reservoir. The curved fuel channel is curved in multiple directions, including curvature around the circumference of the pin (e.g., the channel is shaped as a circle or ellipse) as well as having a vertical curvature as it traverses around the pin (e.g., it is angled with respect to a transverse axis of the injector body/pin). The gap between the top surface and the bottom surface of the curved fuel channel may vary along the curved fuel channel, such that a maximum gap is present that fluidically couples to one or more nozzle holes configured to direct fuel in an area corresponding to high tumble and swirl area of the combustion chamber and a smaller gap is present that fluidically couples to one or more nozzle holes configured to direct fuel to low tumble and swirl areas of the combustion chamber. As the needle and pin are moved downward with respect to the injector body, the fuel channel establishes sequential fluidic communication with each nozzle hole for a specific duration. In one example, the fuel channel has a high point of symmetry and a low point of symmetry. When the fuel channel fluidically couples to a nozzle hole at the high point (e.g., when the high point is at the same vertical plane as the nozzle holes), fluidic communication is only established between the fuel channel and one nozzle hole. Likewise, when the fuel channel fluidically couples to a nozzle hole at the low point (e.g., when the low point is at the same vertical plane as the nozzle holes), fluidic communication is only established between the fuel channel and one other nozzle hole. When the fuel channel fluidically couples to a nozzle hole at any point between the low point and the high point, fluidic communication is established between the fuel channel and two other nozzle holes. Thus, in one actuation event of the needle, the needle may travel through nine open positions, where varying volumes of fuel is first injected out of one nozzle hole, then injected out of seven pairs of nozzle holes sequentially, and then is injected out of one remaining nozzle hole.

FIG. 10 is a flow chart illustrating a method 800 for injecting fuel with a direct fuel injector, such as the fuel injector assembly 200 of FIGS. 2-9. The fuel injector assembly 200 may have the curved fuel channel 204 of any one of the embodiments illustrated in FIGS. 7-9.

Instructions for carrying out method 800 and the rest of the methods included herein may be executed by a controller, for example, the controller 12, based on instructions stored on a memory of the controller and in conjunction with signals received from sensors of the engine system, including NOx sensors, UEGO sensors, pressure sensors, etc., described above with reference to FIG. 1. The controller may employ engine actuators of the engine system to adjust engine operation, according to the methods described below. In one example, based on input from sensors, the controller 12 may employ actuators, such as the actuator 202 of the fuel injector assembly 200 to regulate the position of the injector needle, as illustrated in FIG. 2 and FIGS. 7-9.

Method 800 starts at 802 where engine operating parameters are detected. The engine operating parameters detected may include but are not limited to engine status (e.g., on or off), engine speed and load, current engine position, engine temperature, and other parameters. At 804, a fuel injector of the engine may be in a deactivated first position with no fuel injection through the fuel injector. In one example, the fuel injector may be the fuel injector assembly 200 illustrated in FIG. 2, wherein the injector needle 205 in the deactivated first position does not enable fluidic communication between the curved fuel channel 204, and any of the nozzle holes of the fuel injector. Hence, no fuel is injected into the cylinder.

At 806, method 800 assesses if there is a command for injecting fuel. Fuel may be injected in response to engine load above a threshold and/or in response to the engine firing order and engine position indicating that the injector is to inject fuel to initiate combustion in the cylinder. If no command to inject fuel is received, method 800 loops back to 804 and continues to hold the fuel injector in the deactivated first position. If the command for fuel injection is received, method 800 proceeds to 808 to activate an actuator (e.g., the actuator 202) which may couple to an injector needle (e.g., the injector needle 205) of the fuel injector. Activation of the actuator results in sequential movement of the injector needle downward (towards the engine cylinder) from the deactivated first position to multiple activated positions for enabling fuel injection, each activated position configured to deliver a desired fuel volume via one or more nozzle holes. Examples of activated positions of the fuel injector assembly 200 are illustrated in FIGS. 7-9. In one example, the activated positions may include sequentially moving the injector needle 205 from the deactivated position to the second through the tenth activated positions, as described above with reference to FIGS. 2-9.

At 810, fluidic communication is established between the curved fuel channel and specific nozzle holes of the injector at each position for a specific duration. For example at 812, in the second position the curved fuel channel (at the gap g3) may be in fluidic communication with a first nozzle hole of the sixteen nozzle hole injector for the duration T1, as illustrated in FIG. 7. In another example, at 814, the injector needle in the sixth position may result in fluidic communication between the curved fuel channel at a region of maximum width (e.g., at the gap g2) with a fifth and a thirteenth nozzle hole of the sixteen nozzle holes of the injector for the duration T6 (e.g., the nozzle holes 234 and 242 of the fuel injector assembly 200, as illustrated in FIG. 8). In a further example, at 816, the injector needle in the tenth position may result in fluidic communication between the curved fuel channel (e.g., at the gap g1) and the eighth nozzle hole of the sixteen nozzle holes of the fuel injector (e.g., the nozzle hole 238 of the fuel injector assembly) for the duration T10, described above with reference to FIG. 9. The duration T6 may be longer than the duration T1 and the duration T10. In one example, the duration T1 may be equal to the duration T10. The volume of fuel delivered at 814 may be more than the volume of fuel delivered at 812 or at 816, as the fluidic communication between the curved fuel channel is at the region of maximum width for the duration T6. The fuel injected during each position may be injected in a different region of the combustion chamber.

At 818, for each activated position of the injector, a specific volume of fuel is discharged through the specific nozzle hole in fluidic communication with the curved fuel channel at that position. For example, at the second position a second fuel volume is discharged from the nozzle hole 230, as illustrated in FIG. 7. In the sixth position, a sixth fuel volume is discharged from the nozzle holes 234 and 242, as shown in FIG. 8. In the tenth position, a tenth fuel volume is discharged from the nozzle hole 238, as shown in FIG. 9. In one example, fuel delivered at 814 may be in a region of high tumble and swirl inside the combustion chamber while the fuel may be delivered in an area of less turbulence during 812 and 816.

The extent and/or velocity of downwards movement of the needle may be controlled by the electric actuator in order to control the volume of fuel being injected and spray penetration of the injected fuel at each position of the fuel injector. The velocity of the needle during the downward movement may be constant or near constant.

At 820, method 800 determines if the end of fuel injection event is reached. The duration of the fuel injection event may be based on the volume of charge air inducted into the cylinder and commanded air-fuel ratio, where the volume of charge air may be based on engine parameters such as engine speed, engine load, etc. If the end of the fuel injection event is not reached, method 800 loops back to 818 to continue to inject fuel with the fuel injector assembly sequentially moving from the second through the tenth position, establishing fluidic connection between the curved fuel channel and specific nozzle holes. If the end of the fuel injection event is reached, the method 800 deactivates the actuator. At the end of a fuel injection event, the actuator may be disabled and a pair of retention springs may move the injector needle from the tenth position to the first deactivated position, as illustrated in FIG. 2, disrupting fluidic communication between the curved open fuel channel and the nozzle holes. While the injector needle is moving upward, it may sequentially transition from the tenth position to the deactivated first position, during which some residual fuel may be discharged through each of the nozzle holes fluidically connecting with the open channel. As the injector needle reaches the first position, fuel discharge may stop and the method 800 returns.

The volume of fuel flow to the cylinder may be regulated and fuel spray interaction minimized by the above described method of controlling the position of the fuel injector needle to enable or disable fluidic communication between the curved fuel channel and specific nozzle hole of the fuel injector at each position.

Figure 11:
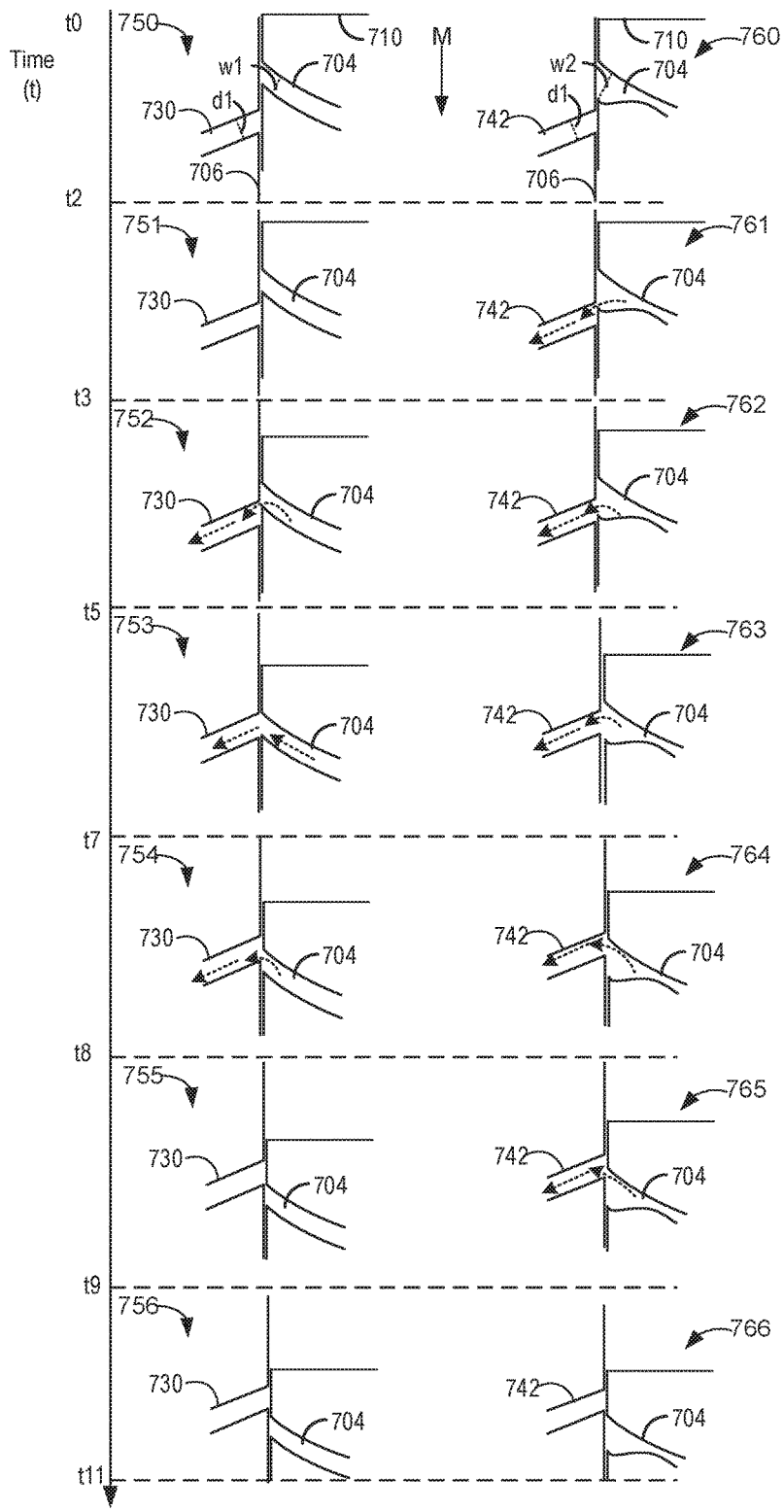
FIG. 11 shows schematics illustrating fluidic communication for fuel injection as an injector needle moves downward during a fuel injection event.

FIG. 11 shows a series of schematics illustrating a difference in duration of fluidic communication between a curved fuel channel of non-uniform width on an injector needle and an injector nozzle hole of a multi-hole injector during a downward movement of the injector needle. Schematics 750-756 illustrate fluidic communication of a region of a curved fuel channel 704 of a width w1 with a nozzle hole 730, and schematics 760-766 show fluidic communication of a region of the curved fuel channel 704 with a width w2 with a nozzle hole 742, where the width w2 is more than the width w1. The width w1 and the width w2 of the curved fuel channel 704 may be present in different regions of the curved fuel channel, similar to the curved fuel channel 204 with the gap g1, the gap g2, and the gap g3 shown in FIG. 3 or similar to the embodiments of the curved fuel channel 204 illustrated in FIGS. 4 and 5.

Time t is shown increasing from a time t0 to t11 during a fuel injection event, where each consecutive time interval (t0-t2, t2-t3, t3-t5, t5-t7, t7-t8, t8-t9, and t9-t11) denotes equal time intervals. A solid line M with an arrowhead shows the direction of downward movement of an injector needle with the curved fuel channel in relation to an injector body and a nozzle hole. The downward movement of the injector needle may be at a constant velocity. It may be noted that the duration of time in the schematics 750-756 and schematics 760-766 may correspond to the time intervals shown (t0-t111). However, as the injector needle moves downward, the events shown in the schematics 760-766 and the in the schematics 750-756 may not be executed simultaneously. In one example, the events shown in the schematics 760-766 may occur first and may be subsequently followed by the events shown in the schematics 750-756, as the fuel channel is curved and the each open position occurs exclusively without overlapping with other open positions, as discussed above with reference to FIGS. 2-9.

The schematic 750 shows the nozzle hole 730 with a diameter d1 along an injector body 706 and a region of an injector needle 710 with the curved fuel channel 704. In one example, the schematic may represent the fuel injector assembly discussed above with reference to FIGS. 2 and 7. The width w1 of the curved fuel channel 704 is shown in the schematic 750. During the duration t0-t2, the schematic 750 shows no fluidic communication with the nozzle hole 730 and the curved fuel channel 704 and hence, no fuel is injected through the nozzle hole 730.

Schematics 751-756 show a sequential downward movement of the injector needle 710 in relation to the nozzle hole 730. Between t2-t3, the schematic 751 shows that the injector needle moves downward, for example, in response to fuel injection command, but no fluidic communication is established between the curved fuel channel 704 and the nozzle hole 730 and no fuel is injected.

Between t3-t5, the injector needle moves further downward in relation to the injector body 706 and the nozzle hole 730, establishing fluidic communication between the curved fuel channel 704 and the nozzle hole 730, where the diameter d1 of the nozzle hole may partially overlap with the width w1 of the curved fuel channel 704, as shown by the schematic 752. In one example, the curved fuel channel 704 may overlap with twenty percent of the diameter d1 of the nozzle hole 730. During the partial overlap of the curved fuel channel 704 and the nozzle hole 730, fuel is injected through the nozzle hole 730, as indicated by dashed lines with arrowheads.

The injector needle continues moving downward, and between t5-t7, the width w1 of the fuel channel may be in apposition with the diameter d1 of the nozzle hole 730, discharging fuel through the nozzle hole 730, as shown in the schematic 753. In one example, the width w1 of the curved fuel channel 704 may completely align with the diameter d1 of the nozzle hole 730. Between t7-t8, schematic 754 shows that the injector needle 710 moves further down, still maintaining the fluidic communication by partial overlap between the curved fuel channel and the nozzle hole 730, injecting fuel through the nozzle hole 730.

The injector needle continues to move downward between t8-t9, where the fluidic communication between the nozzle hole 730 and the curved fuel channel is blocked, ending fuel injection through the nozzle hole 730 (schematic 755). Subsequently, the injector needle moves down further but no fuel is injected through the nozzle hole 730 between t9-t11, as shown in the schematic 756.

The schematic 760 shows another region of the injector needle 710 where the curved fuel channel 704 has the width w2. The schematic also shows a nozzle hole 742 with the diameter d1. The width w2 may be more than the width w1 of the curved fuel channel 704, as shown in the schematic 750. Between t0 and t2, no fluidic communication is present between the curved fuel channel 704 and the nozzle hole 742 and no fuel is injected.

In schematics 761-766, the injector needle with the curved fuel channel moves downward, establishing fluidic communication between the curved fuel channel 704 with the width w2 and the nozzle hole 742. During the duration t2-t3, fuel injection starts through the nozzle hole 742. The overlap between the nozzle hole 742 and the curved fuel channel may be partial during t2-t3, for example, ten percent of the diameter d1 of the injector nozzle may overlap with the curved fuel channel.

The fuel injection continues during t3-t5, t5-t7, t7-t8, t8-t9, as the injector needle continues to move downward, while the fluidic communication between the nozzle hole 742 and the curved fuel channel with the width w2 remains intact, ranging from partial to complete overlap. During t3-t5 (schematic 762), the nozzle hole 742 may partially overlap with the curved fuel channel 704, for example, sixty percent of the diameter d1 may overlap with the curved fuel channel, injecting fuel through the nozzle hole 742. During the duration t5-t7 (schematic 763), the area of overlap between the nozzle hole 742 and the curved fuel channel may increase, such that the diameter d1 is completely overlapping with the width w2 of the curved fuel channel, with some additional areas of the width w2 not in apposition with the nozzle hole 742, as the width w2 may be more than the diameter d1. During t7-t8 (schematic 764), as the injector needle moves further down, the overlap between the curved fuel channel 704 and the nozzle hole 742 may again become partial (for example, fifty percent), still injecting fuel through the nozzle hole. During t8-t9 (schematic 765), the overlap may further decrease, for example ten percent overlap, while still maintaining fluidic communication and fuel injection through the nozzle hole 742. As the injector needle continues to move downward, fluidic communication between the nozzle hole 742 and the curved fuel channel is blocked between t9-t11, as illustrated by the schematic 766.

Thus, fuel is injected through the nozzle hole 742 by establishing partial to complete overlap between the region of the curved fuel channel with width w2 from the duration t2-t9. As the width w1 of the curved fuel channel 704 is less than the width w2, the duration of fluidic communication of the curved fuel channel with the nozzle hole 742 is longer (e.g., from t2-t9) than the duration of fluidic communication of the curved fuel channel with the nozzle hole 730 (e.g., from t3-t8). A larger volume of fuel may thus be delivered through the nozzle hole 742 compared to the nozzle hole 730 during the downward movement of the injector needle.

Thus, a multi-hole fuel injector assembly with an injector needle with a curved fuel channel of non-uniform width may be sequentially positioned, such that each position may establish fluidic communication between the curved fuel channel and specific nozzle hole/s for a duration based on the width of the curved fuel channel in apposition with the specific nozzle hole/s. At each position, a specific volume of fuel may be injected through the nozzle hole into a specific area of the combustion chamber, thereby minimizing fuel spray interaction and increasing fuel spray atomization.

The technical effect of injecting a different volume of fuel using a multi-hole fuel injector in different regions of a combustion chamber with varying air turbulence includes minimal fuel spray interaction and enhanced fuel spray atomization, which may result in more efficient combustion and reduce emissions.

An example fuel injector system includes an injector body with a plurality of nozzle holes, and an injector needle coupled to an injector pin, the injector pin including a curved fuel channel in fluidic communication with a fuel reservoir inside the injector pin, the injector needle and the injector pin housed inside the injector body, the curved fuel channel including a first region having a first width and a second region having a second width, larger than the first width, and when the injector needle is actuated, the first region is configured to be in fluidic communication with a first nozzle hole of the plurality of nozzle holes to deliver a first fuel volume, and the second region is configured to be in fluidic communication with a second nozzle hole of the plurality of nozzle holes to deliver a second fuel volume, larger than the first fuel volume. A first example of the system includes, wherein the curved fuel channel includes a top surface and a bottom surface, the top surface separated by the first width from the bottom surface, except in at least one area of the curved fuel channel where the bottom surface curves away from the top surface, establishing the second width of the curved fuel channel, followed by the bottom surface approaching the top surface to maintain the first width of the curved fuel channel. A second example of the system optionally includes the first example and further includes, wherein the top surface is separated by the first width from the bottom surface, except in the at least one area of the curved fuel channel where the top surface curves away from the bottom surface, establishing the second width of the curved fuel channel, followed by the top surface approaching the bottom surface to maintain the first width of the curved fuel channel. A third example of the system optionally includes one or more of the first and second examples, and further includes, wherein the top surface is separated by the first width from the bottom surface, except in the at least one area of the curved fuel channel where the top surface and the bottom surface curve away from each other, establishing the second width of the curved fuel channel, followed by the top surface and the bottom surface approaching each other to maintain the first width of the curved fuel channel. A fourth example of the system optionally includes one or more of the first through the third examples, and further includes wherein the top surface is separated by the first width from the bottom surface, except in the at least one area of the curved fuel channel where the top surface and the bottom surface curve away from each other, establishing the second width of the curved fuel channel, followed by the top surface and the bottom surface approaching each other to maintain the first width of the curved fuel channel. A fifth example of the system optionally includes one or more of the first through the fourth examples, and further includes an actuator coupled to the injector needle, and a controller storing non-transitory instructions that when executed cause the controller to, responsive to a command to inject fuel, activate the actuator to push the injector needle in a downward direction, sequentially establishing fluidic communication between the curved fuel channel and each nozzle hole of the plurality of nozzle holes, a duration of each fluidic communication between the curved fuel channel and each nozzle hole dependent on a respective width of the curved fuel channel when in apposition with each nozzle hole. A sixth example of the system optionally includes one or more of the first through the fifth examples, and further includes wherein when the actuator is activated, fluidic communication is sequentially established between the curved fuel channel and only the first nozzle hole for a first duration, then a second set of nozzle holes for a second duration, then a third set of nozzle holes for a third duration, then a fourth set of nozzle holes for a fourth duration, then a fifth set of nozzle holes, including the second nozzle hole, for a fifth duration, then a sixth set of nozzle holes for the fourth duration, then a seventh set of nozzle holes for the third duration, then an eighth set of holes for the second duration, and then only a last nozzle hole for the first duration. A seventh example of the system optionally includes one or more of the first through the sixth examples, and further includes wherein each nozzle hole of the fifth set of nozzle holes is configured to deliver the second fuel volume inside a combustion chamber of an engine cylinder when the injector needle is actuated. An eighth example of the system optionally includes one or more of the first through the seventh examples, and further includes wherein the fifth duration is more than the first duration and the second duration, and wherein the third duration and the fourth duration are each equal to or less than the fifth duration and are each equal to or more than then the first duration. A ninth example of the system optionally includes one or more of the first through the eighth examples, and further includes wherein the fifth set of nozzle holes are positioned to direct fuel into a region of high tumble and swirl and the first nozzle hole and the last nozzle hole are positioned to direct fuel into a region of low tumble and swirl in a combustion chamber. A tenth example of the system optionally includes one or more of the first through the ninth examples, and further includes wherein when the actuator pushes the injector needle to a first position, fluidic communication is established between the curved fuel channel and the first nozzle hole and when the actuator pushes the injector needle to a second position, fluidic communication between the curved fuel channel and the first nozzle hole is blocked, and fluidic communication between the curved fuel channel and the second set of nozzle holes is established. An eleventh example of the system optionally includes one or more of the first through the tenth examples, and further includes wherein the curved fuel channel is positioned at an angle relative to a transverse axis of the injector pin, such that the curved fuel channel passes through multiple vertical planes as it curves around the circumferential surface of the injector pin.

An example method of operating a fuel injector, comprising actuating a needle having a fuel channel housed within a fuel injector body to sequentially move the needle downward from a closed position to a first open position of a plurality of open positions, fluidically connecting a first width of the fuel channel to a first nozzle hole, followed by moving the needle downward, fluidically disconnecting the first width of the fuel channel from the first nozzle hole, and fluidically connecting a second width of the fuel channel to a second nozzle hole at a second open position of the plurality of open positions, where the second width is greater than the first width. A first example of the method further comprising fluidically connecting the first nozzle hole to the fuel channel for a first duration in the first open position and fluidically connecting the second nozzle hole to the fuel channel for a second duration in the second open position, the second duration longer than the first duration, wherein the first duration is based on at least partial overlap between the first width of the fuel channel and a first diameter of the first nozzle hole and the second duration is based on at least partial overlap between the second width and a second diameter of the second nozzle hole, where the second diameter is equal to the first diameter. A second example of the method optionally includes the first example and further comprising injecting a first volume of fuel through the first nozzle hole during the first open position and injecting a second volume of fuel through the second nozzle hole during the second open position, where the first volume of fuel is less than the second volume of fuel. A third example of the method optionally includes the first through the second examples, and further comprising injecting the first volume of fuel in a first area of a combustion chamber and injecting the second volume of fuel in a second area of the combustion chamber, the second area having more turbulent air flow with higher tumble and swirl than air flow in the first area. A fourth example of the method optionally includes the first through the third examples, and further comprising fluidically connecting the second nozzle hole to the second width of a second region of the fuel channel and fluidically connecting a third nozzle hole simultaneously to the second width a third region of the fuel channel during the second open position, the third region in an area different from the second region of the fuel channel, and injecting the second volume of fuel through each of the second nozzle hole and the third nozzle hole. A fifth example of the method optionally includes the first through the fourth examples, and further includes wherein actuating the needle to sequentially move the needle downward from the closed position through the plurality of open positions comprises actuating the needle to sequentially move through nine open positions, each of the nine open positions including fluidic communication between specific injector holes and a specific region of the fuel channel, injecting a different volume of fuel during at least one of the open positions of the plurality of open positions. A sixth example of the method optionally includes the first through the fifth examples, and further comprising moving the needle upward sequentially through the plurality of open positions, injecting residual fuel from the fuel channel during the plurality of open positions, and moving the needle back to the closed position, ending fuel injection.

Another example system, including an engine having a cylinder, a fuel supply, a fuel injector coupled to the cylinder, the fuel injector including an injector body having a plurality of nozzle holes, the injector body including a fuel passage coupled to the fuel supply, an injector needle coupled to an injector pin, the injector pin encircled by a curved fuel channel of non-uniform width in fluidic communication with a fuel reservoir inside the injector pin, the injector pin housed inside the injector body, the fuel reservoir in fluidic communication with the fuel passage, and an actuator coupled to the injector needle, and a controller storing non-transitory instructions in memory that when executed cause the controller to, responsive to a command to inject fuel to the cylinder, activate the actuator to push the injector needle in a downward direction, sequentially establishing fluidic communication between the curved fuel channel and a respective nozzle hole of the plurality of nozzle holes, where a first duration of fluidic communication is established based on a first width of the curved fuel channel at least partially overlapping with a first diameter of a first nozzle hole, and a second duration of fluidic communication is established with a second width of the curved fuel channel at least partially overlapping with a second diameter of a second nozzle hole, where the first width is less than the second width, the first diameter is equal to the second diameter, and the first duration is less than the second duration. A first example of the system further includes, wherein the second nozzle hole fluidically connects to an area of high tumble and swirl and the first nozzle hole fluidically connects to an area of low tumble and swirl inside a combustion chamber.

In another representation, a method comprises, during a single fuel injection event for a fuel injector having a plurality of nozzle holes, injecting a first volume of fuel from a first nozzle hole of the plurality of nozzle holes, and injecting a second volume of fuel from a second nozzle hole of the plurality of nozzle holes, the first volume less than the second volume. In a first example, the method includes, during the single fuel injection event, injecting a third volume of fuel from each of a third nozzle hole and a fourth nozzle hole of the plurality of nozzle holes, the third volume less than the second volume and greater than the first volume. In a second example, which optionally includes the first example, the method includes, during the single fuel injection event, injecting the first volume of fuel from all remaining nozzle holes of the plurality of nozzle holes. In a third example, which optionally includes one or each of the first and second examples, the plurality of nozzle holes are arranged on an injector body of the fuel injector, and the injector body houses an injector needle coupled to an injector pin. The injector pin includes a curved fuel channel in fluidic communication with a fuel reservoir inside the injector pin, the curved fuel channel including a first region having a first width and a second region having a second width, larger than the first width. Injecting the first volume of fuel from the first nozzle hole includes moving the injector pin to a first position where the first region is fluidically coupled to the first nozzle hole, and injecting the second volume of fuel from the second nozzle hole includes moving the injector pin to a second position where the second region is fluidically coupled to the second nozzle hole. In a fourth example, which optionally includes one or more of the first through third examples, the injector pin is moved downward to sequentially couple the curved fuel channel with each nozzle hole of the plurality of nozzle holes, and wherein during the downward movement of the injector pin, the injector pin moves with substantially constant velocity. As used herein, "substantially" may include being equal to or within a threshold range of a given value. A substantially constant velocity may include a velocity that changes by less than a threshold amount, such as 10%.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed four, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
actuating a fuel injector needle having a fuel channel within a body to sequentially move the needle downward from a closed to a first open position, fluidically connecting a first fuel channel width to a first nozzle hole, followed by moving the needle downward, fluidically disconnecting the first width, and fluidically connecting a second, wider, fuel channel width to a second nozzle hole at a second open position.

2. The method claim 1, further comprising fluidically connecting the first nozzle hole to the fuel channel for a first duration in the first open position and fluidically connecting the second nozzle hole to the fuel channel for a second duration in the second open position, the second duration longer than the first duration, wherein the first duration is based on at least partial overlap between the first width of the fuel channel and a first diameter of the first nozzle hole and the second duration is based on at least partial overlap between the second width and a second diameter of the second nozzle hole, where the second diameter is equal to the first diameter.

3. The method of claim 1, further comprising injecting a first volume of fuel through the first nozzle hole during the first open position and injecting a second volume of fuel through the second nozzle hole during the second open position, where the first volume of fuel is less than the second volume of fuel.

4. The method of claim 3, further comprising injecting the first volume of fuel in a first area of a combustion chamber and injecting the second volume of fuel in a second area of the combustion chamber, the second area having more turbulent air flow with higher tumble and swirl than air flow in the first area.

5. The method of claim 1, further comprising:
fluidically connecting the second nozzle hole to the second width of a second region of the fuel channel and fluidically connecting a third nozzle hole simultaneously to the second width of a third region of the fuel channel during the second open position, the third region in an area different from the second region of the fuel channel, and
injecting the second volume of fuel through each of the second nozzle hole and the third nozzle hole.

6. The method of claim 1, wherein actuating the needle to sequentially move the needle downward from the closed position through a plurality of the open positions comprises actuating the needle to sequentially move through nine open positions, each of the nine open positions including fluidic communication between specific injector holes and a specific region of the fuel channel, injecting a different volume of fuel during at least one of the open positions of the plurality of open positions.

7. The method of claim 1, further comprising moving the needle upward sequentially through a plurality of open positions, injecting residual fuel from the fuel channel during the plurality of open positions, and moving the needle back to the closed position, ending fuel injection.

\* \* \* \* \*